(12) United States Patent
Shiraki et al.

(10) Patent No.: US 7,724,455 B2
(45) Date of Patent: May 25, 2010

(54) LENS DRIVE DEVICE

(75) Inventors: Manabu Shiraki, Yamato (JP); Junichi Tada, Yamato (JP)

(73) Assignee: Shicoh Engineering Co., Ltd., Kanagawa (JP)

( * ) Notice: Subject to any disclaimer, the term of this patent is extended or adjusted under 35 U.S.C. 154(b) by 141 days.

(21) Appl. No.: 11/992,316

(22) PCT Filed: Oct. 31, 2006

(86) PCT No.: PCT/JP2006/321771

§ 371 (c)(1),
(2), (4) Date: Mar. 20, 2008

(87) PCT Pub. No.: WO2007/052669

PCT Pub. Date: May 10, 2007

(65) Prior Publication Data

US 2009/0161231 A1    Jun. 25, 2009

(30) Foreign Application Priority Data

Nov. 7, 2005    (JP)    ............................... 2005-322022

(51) Int. Cl.
G02B 7/02    (2006.01)
(52) U.S. Cl. ...................................... 359/824; 359/819
(58) Field of Classification Search ................ 359/824, 359/819, 821, 822, 823, 811
See application file for complete search history.

(56) References Cited

U.S. PATENT DOCUMENTS 5,202,992 A    4/1993    Banno et al.

2005/0259155 A1 * 11/2005    Okada ..................... 348/207.99
2006/0056795 A1 *  3/2006    Shinke et al. ............... 385/147

FOREIGN PATENT DOCUMENTS

| JP | 5-5820 | 1/1993 |
| JP | 2005-305353 | 11/2005 |
| JP | 2006-214736 | 8/2006 |

OTHER PUBLICATIONS

International Search Report issued Feb. 13, 2007 in the International (PCT) Application No. PCT/JP2006/321771.
International Preliminary Report on Patentability issued Sep. 18, 2008 in the International (PCT) Application No. PCT/JP2006/321771.

* cited by examiner

Primary Examiner—Timothy J Thompson
(74) Attorney, Agent, or Firm—Wenderoth, Lind & Ponack, L.L.P.

(57) ABSTRACT

A lens drive device having a simple structure and small sized. The lens drive device (1) has a lens holder (3, 5), a drive shaft (21) into which one end of the lens holder (3, 5) is fitted and placed along the direction of the optical axis of lenses (14, 16), and a piezo element (17) provided at a base end (21a) of the drive shaft (21). The base end (21a) of the drive shaft (21) is fixed to a vibrator (19) of the piezo element (17), and the drive shaft (21) is vibrated in the direction of its axis by vibration of the vibrator (19) produced by conducting a pulse current to the piezo element (17). The lens holder (3, 5) is moved in the optical axis direction by using repetition of inertia force and friction force of the holder relative to the drive shaft (21).

1 Claim, 8 Drawing Sheets

[FIGS. 1]
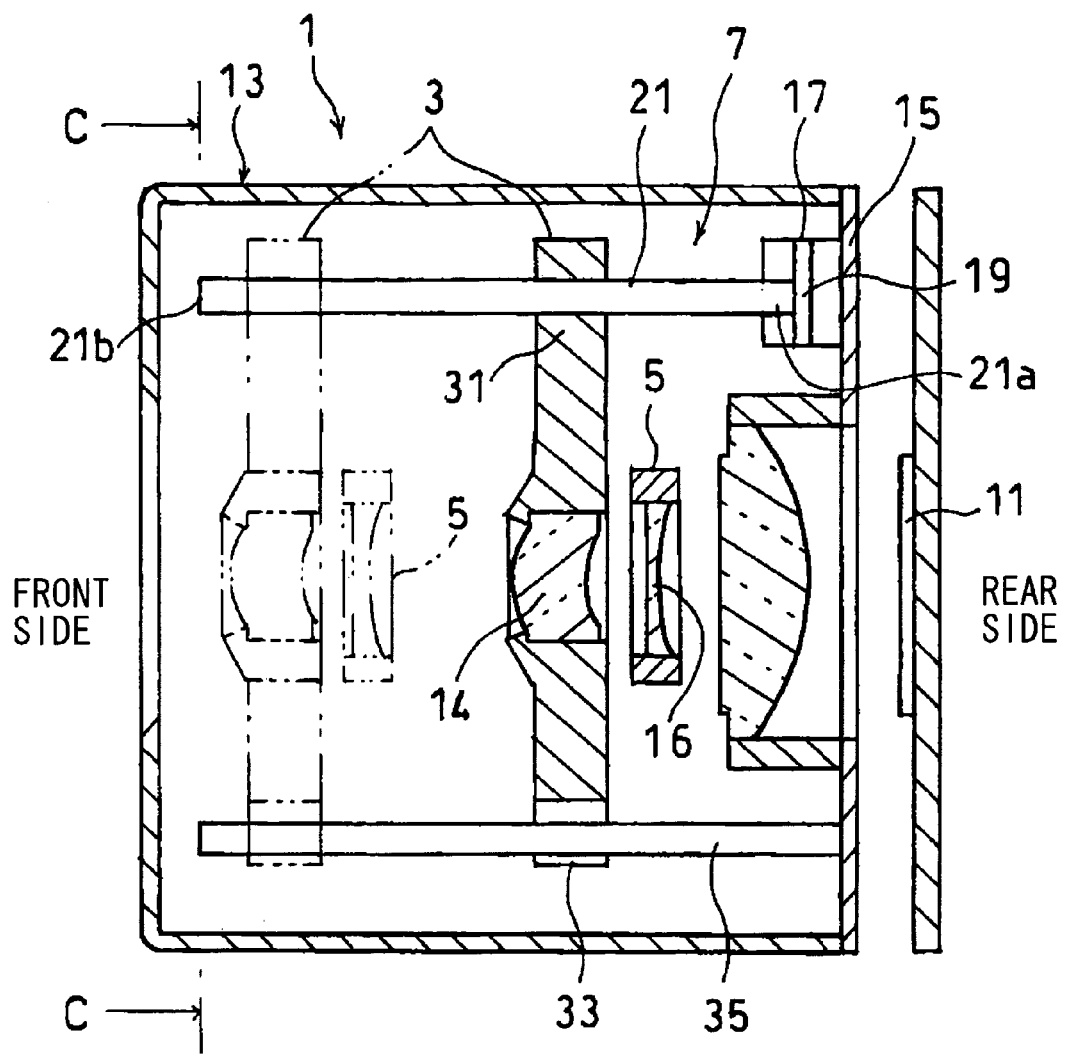

[FIGS. 2]
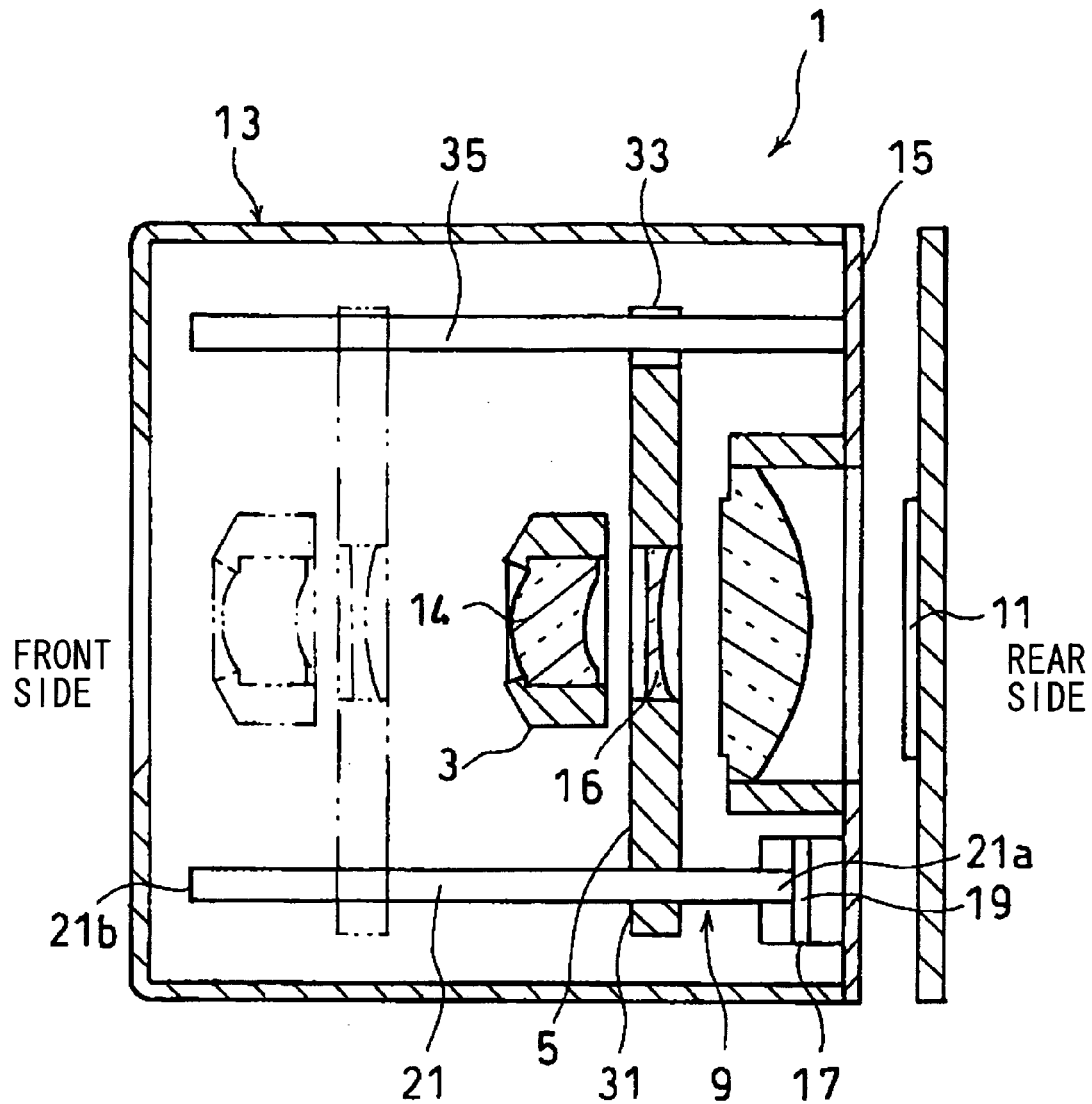

[FIGS. 3]
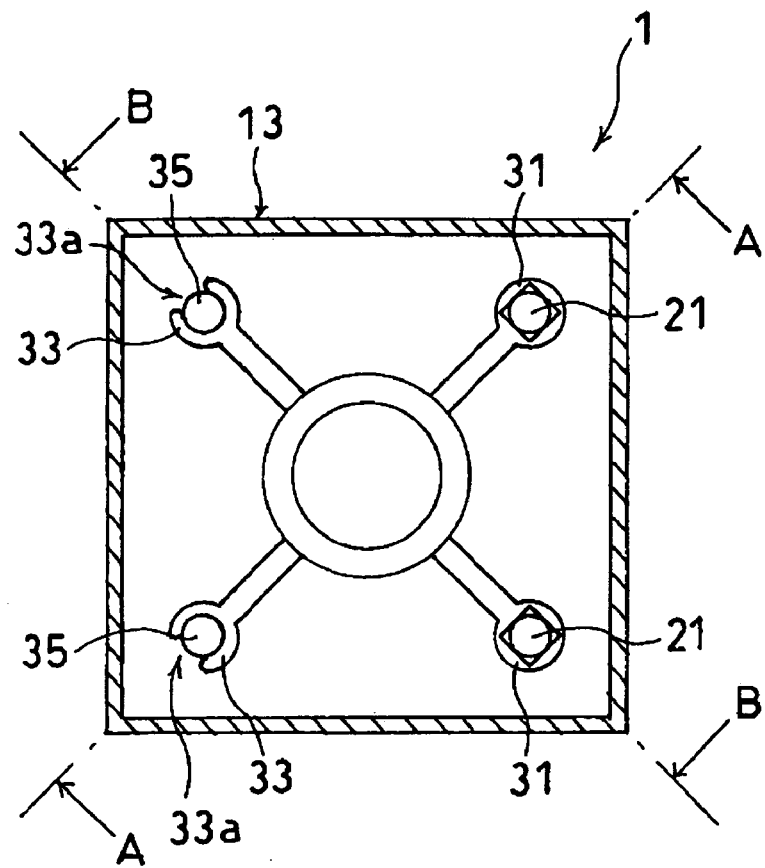
[FIGS. 4]
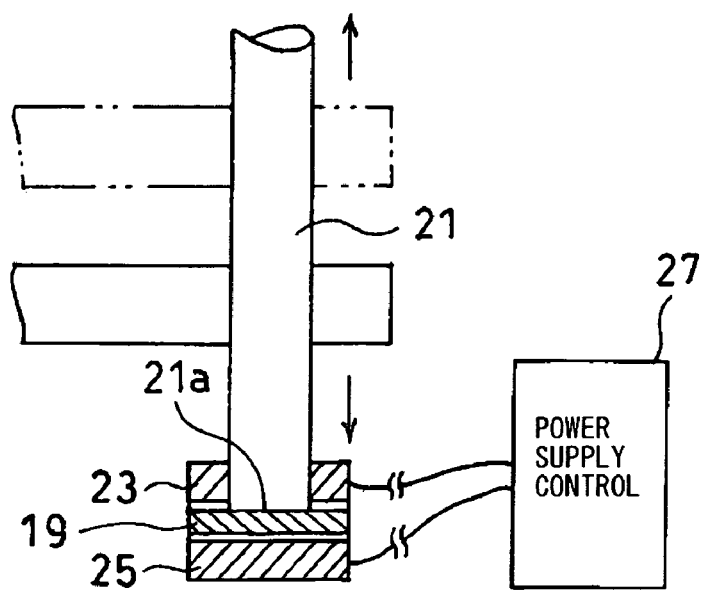

[FIGS. 5]
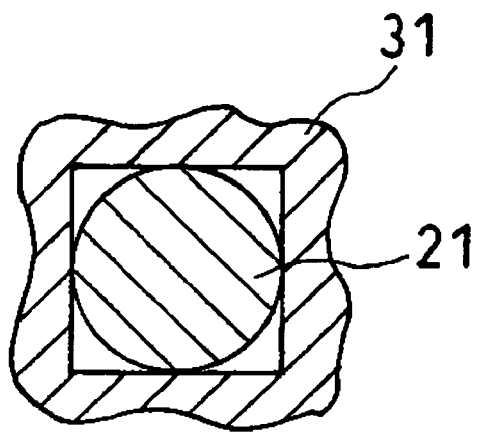
[FIGS. 6]
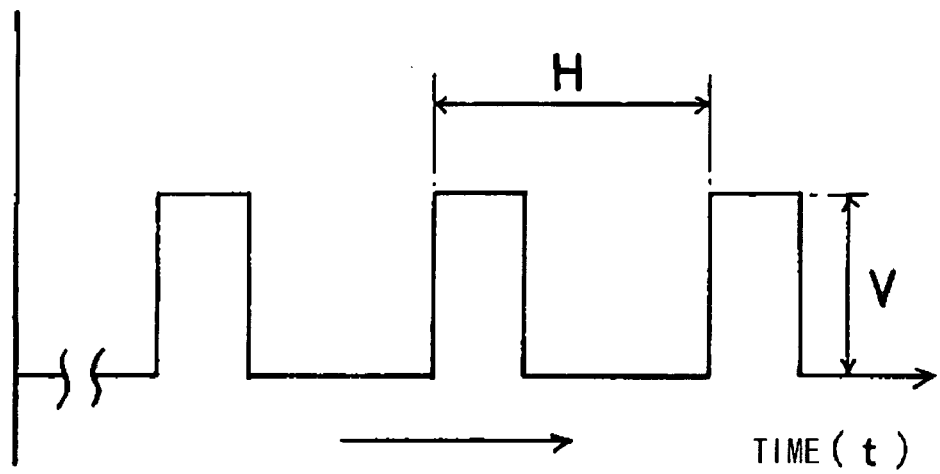

[FIGS. 7]
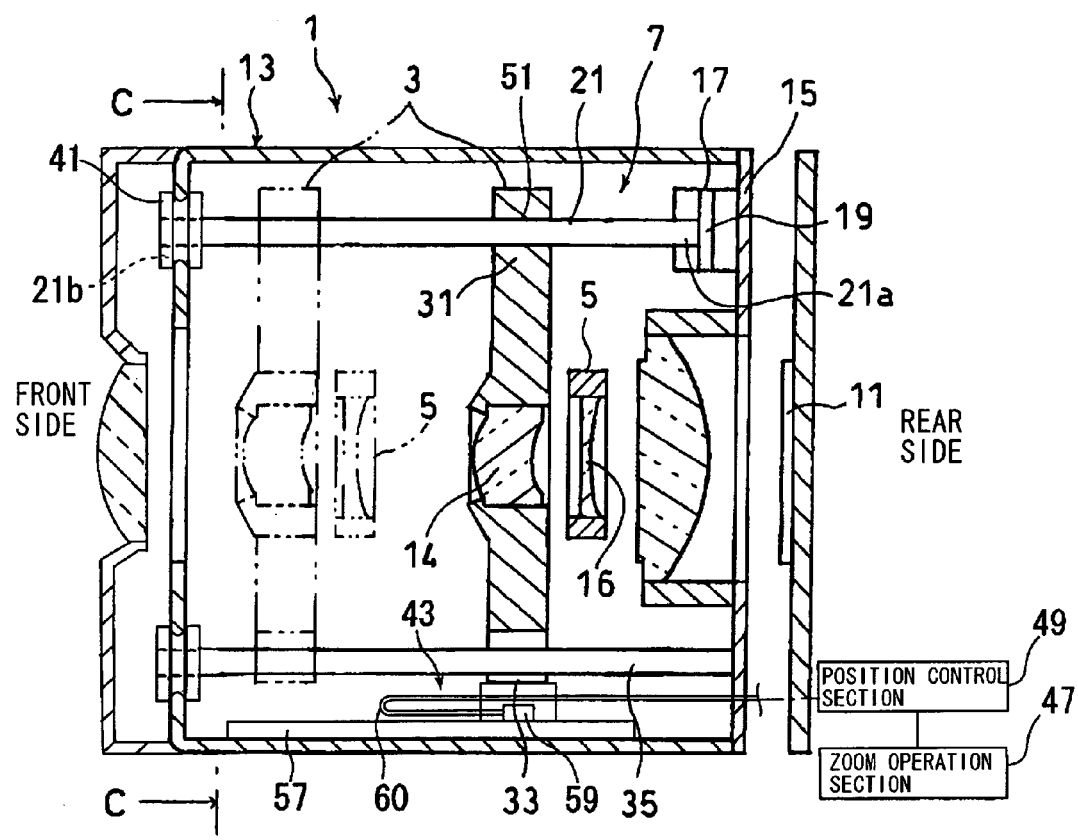

[FIGS. 8]
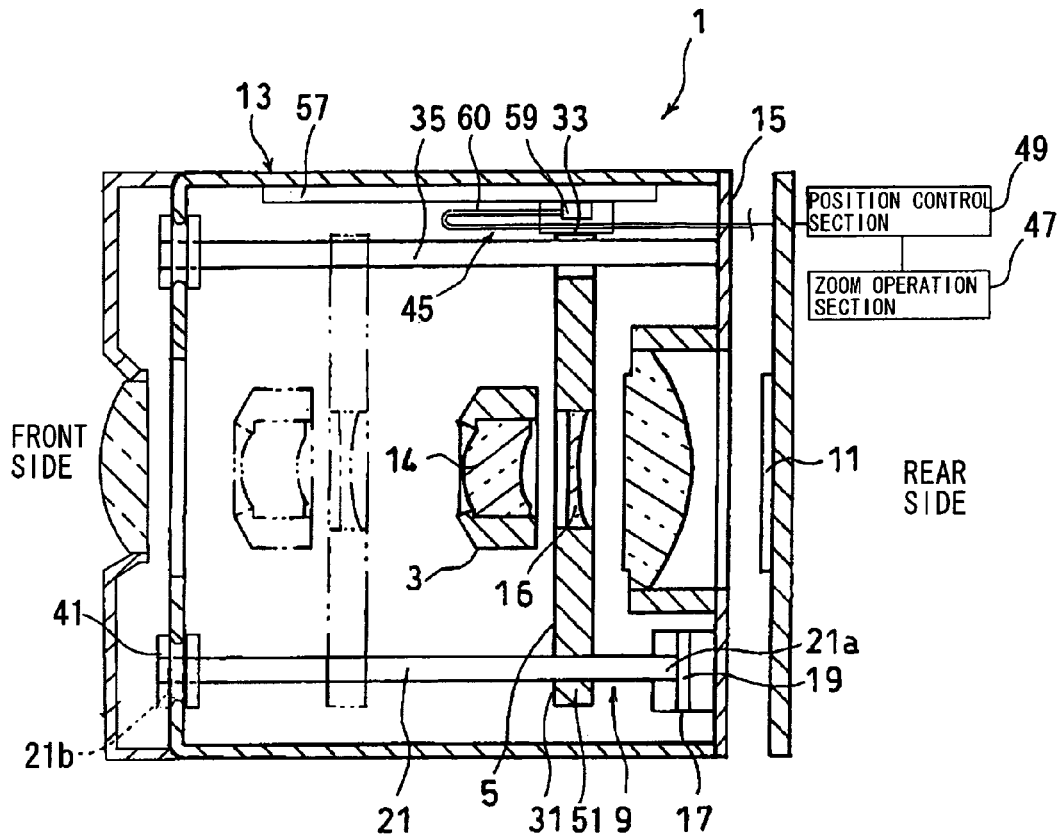
[FIGS. 9]
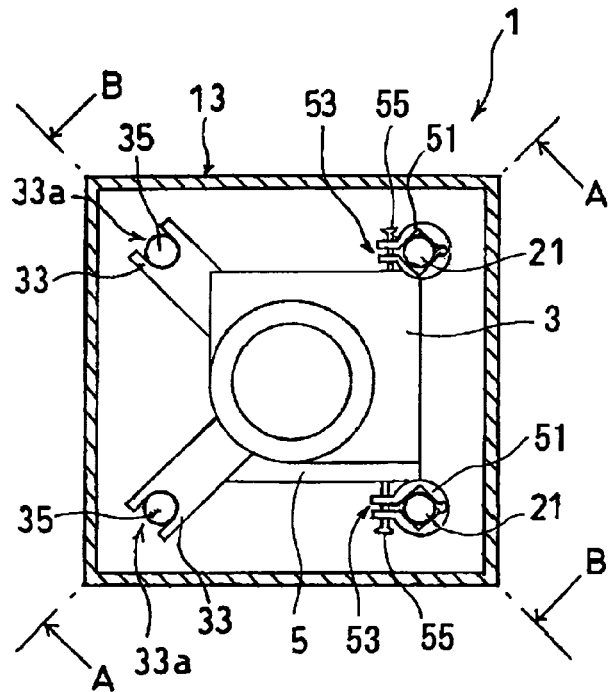

[FIGS. 10]
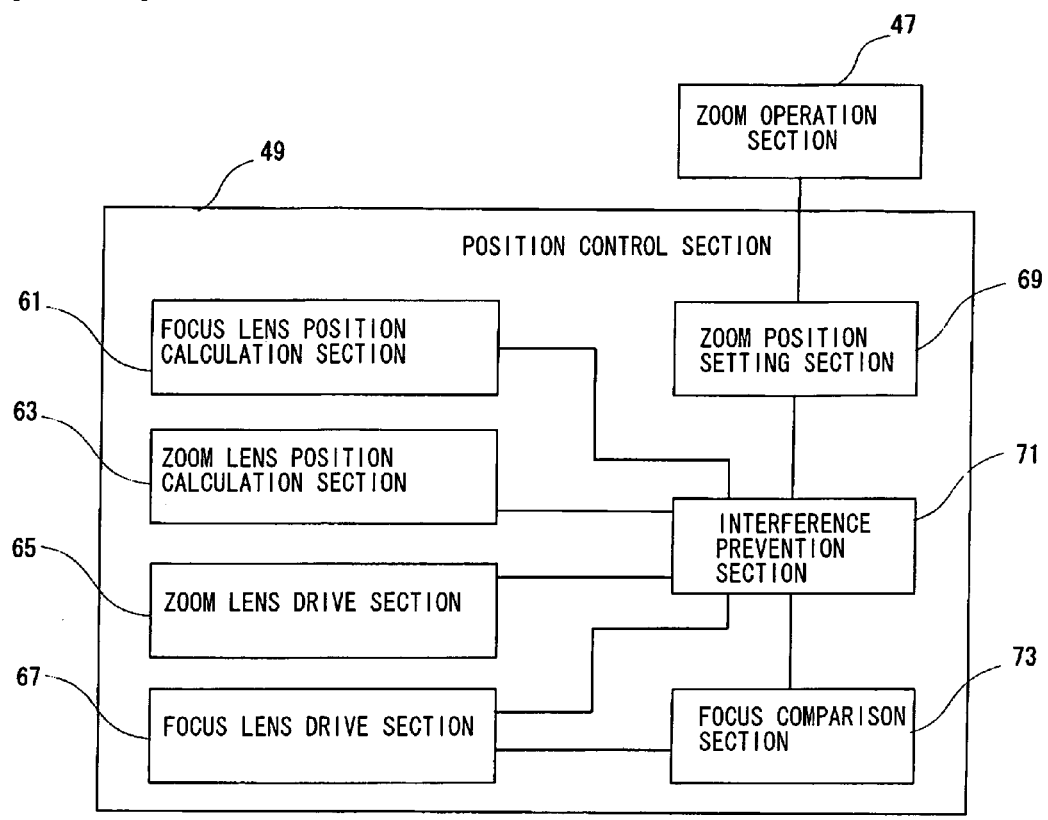

[FIGS. 11]
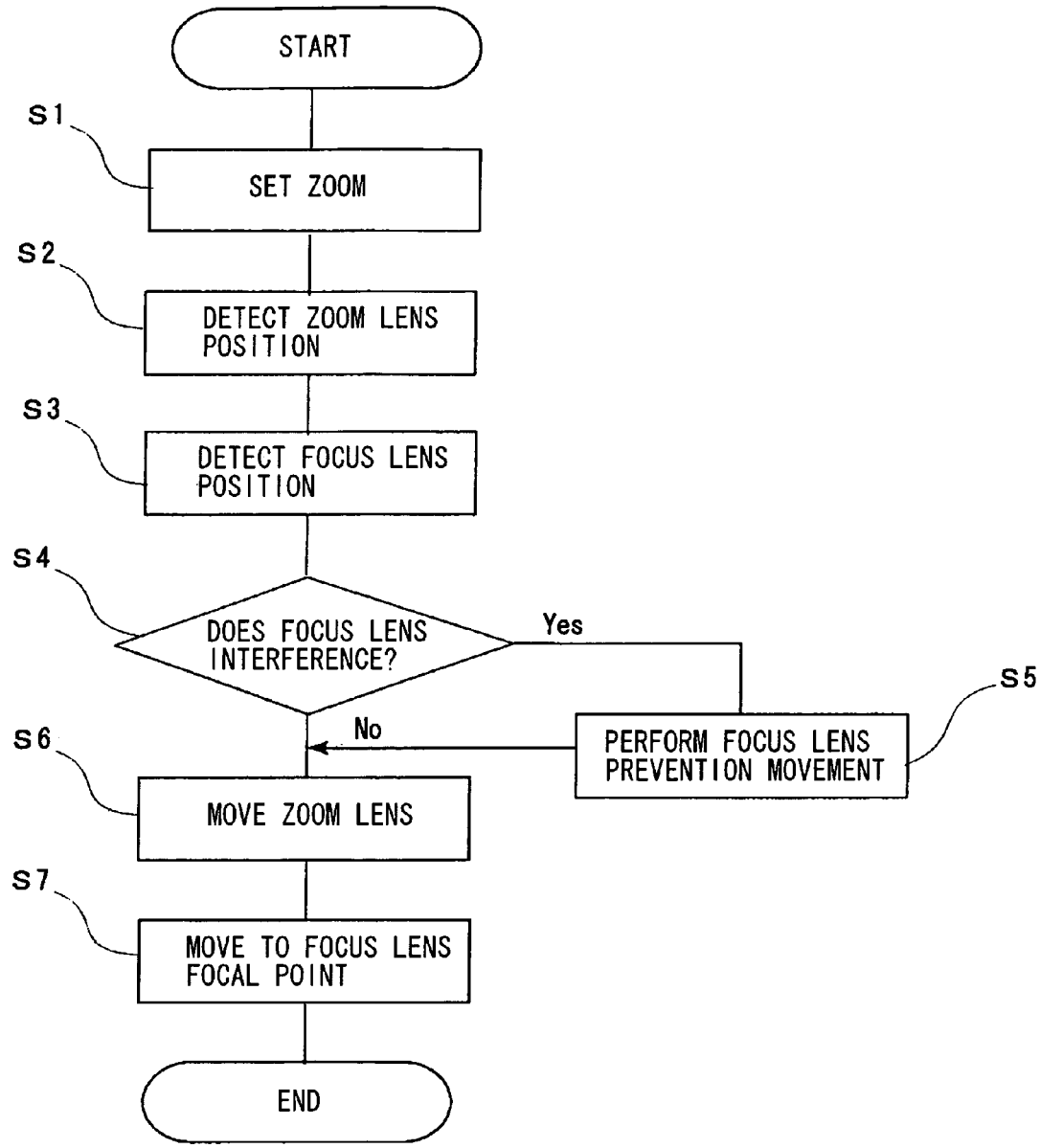

LENS DRIVE DEVICE

TECHNICAL FIELD

The present invention relates to a lens drive device that is mounted on a camera to drive a lens in an optical axis direction.

BACKGROUND ART

Patent document 1 discloses a lens drive device in which a lens holder is driven in an optical axial direction by a linear motor having a magnet, a coil, and a yoke in an optical axial direction.

Patent document 2 discloses that a piezoelectric element is provided at an end portion of a reflector and current is applied to the piezoelectric element to thereby slightly deform the end portion of the reflector and achieve positioning.

Patent document 1:Unexamined Japanese Patent Publication No. 2002-23037

Patent document 2:Unexamined Japanese Patent Publication No. 2000-121950

DISCLOSURE OF INVENTION

Problems to be Solved by the Invention

However, in the technique of patent document 1, there is a limitation in miniaturization of the lens drive device since the linear motor mechanism having the magnet, etc., is provided in the moving direction of the lens holder.

In patent document 2, the piezoelectric element is simply used to slightly deform the reflector and the use of the piezoelectric element is limited to its movable range.

On the other hand, demand for further miniaturization of the lens drive device has been rapidly increasing.

Accordingly, it is an object of the present invention is to provide a lens drive device having a simple structure and small size.

Means for Solving the Problems

According to a first aspect of the present of the present invention, there is provided a lens drive device including a lens holder, a drive shaft into which one end of the lens holder is inserted and being disposed along an optical axis direction of a lens, and a piezoelectric element provided at a base end of the drive shaft wherein the base end of the drive shaft is fixed to a vibrator of the piezoelectric element, the drive shaft is vibrated in an axial direction by conducting a pulse current to the piezoelectric element, whereby the lens holder is moved in the optical axis direction.

According to a second aspect of the present invention, in accordance with the first aspect of the present invention, the piezoelectric element includes counter electrodes being disposed at one side of an optical axis and the other side thereof, respectively, and the lens holder is moved forward by carrying a current to the counter electrode at one side and is moved backward by carrying a current to the counter electrode at the other side.

According to a third aspect of the present invention, in accordance with the first or second aspect of the present invention, the lens drive device further includes an auxiliary shaft disposed to be substantially parallel to the drive shaft wherein the lens holder has an engaging portion with the auxiliary shaft, and the engaging portion abuts against the auxiliary shaft to be supported.

According to a fourth aspect of the present invention, in accordance with any one of the first to third aspects of the present invention, a cross section of a fitting portion of the lens holder to be inserted into the drive shaft and that of the drive shaft are polygonal shaped and circular or elliptical shaped, respectively, and one end of the holder and the drive shaft come in point contact with each other at their cross sections.

According to a fifth aspect of the present invention, in accordance with the third aspect of the present invention, a cross section of the engaging section with the auxiliary shaft of the lens holder is substantially U-shaped, and a U-shape opening is formed at a side far away from the drive shaft .

According to a sixth aspect of the present invention, in accordance with the first aspect of the present invention, the lens holder is an optical zoom lens holder and an optical focus lens holder, and includes a zoom lens position detector that detects a position of the optical zoom lens holder, a focus lens position detector that detects a position of the optical focus lens holder, a zoom setting section, and a position control section wherein when determining that the focus lens holder exists in a moving range from a current position of the zoom lens holder to a position of a magnification set by the zoom setting section, the position control section moves the focus lens holder outside a moving range of the zoom lens holder and thereafter moves the zoom lens holder to the set position.

Effects of the Invention

According to the first aspect of the present invention, the drive shaft is vibrated in the axial direction of the drive shaft by conducting the pulse current to the piezoelectric element, and therefore an inertia force and a frictional force relative to the drive shaft repeatedly act on a fitting portion of the lens holder to be inserted into the drive shaft, thereby allowing the lens holder to be moved in the optical direction.

Therefore, according to the lens drive device of the present invention, since the drive mechanism of the lens holder includes only the piezoelectric element and the drive shaft, it is unnecessary to provide a magnet, a yoke, a coil, and the like unlike the linear motor mechanism, thus allowing the mechanism to be simplified and extremely miniaturized.

According to the second aspect of the present invention, the same operation and effect as that in the first aspect of the present invention can be obtained, moreover forward and backward movement of the lens holder can be controlled with a simple structure and in an easy manner.

According to the third aspect of the present invention, the same operation and effect as that in the first or second aspect of the present invention can be obtained, moreover the auxiliary shaft supports the lens holder by engagement, and therefore it is possible to move the lens holder stably. Moreover, since the engaging portion of the lens holder only abuts against the auxiliary shaft, even if the lens holder is vibrated by vibration of the drive shaft, this little affects movement.

According to the fourth aspect of the present invention, the same operation and effect as that in any one of the first to third aspects the present invention can be obtained, moreover the fitting portion of the holder and the drive shaft come in point contact with each other at their cross sections, thereby making it possible to release powder, dust and like caused by friction between the drive shafts and one end of the holder to a non-contact portion and achieve high driving reliability.

According to the fifth aspect of the present invention, the same operation and effect as that in the third aspect of the present invention can be obtained, moreover an auxiliary shaft side end is opened though slight shaking is caused on the lens holder by vibration of the drive shaft, therefore it is possible to prevent interference with the auxiliary shaft due to vibration (shaking) of the lens holder in a direction crossing the drive shaft and obtain smooth driving.

According to the sixth aspect of the present invention, the same operation and effect as that in the first aspect of the present invention can be obtained, moreover when the magnification of the optical zoom is set, interference between the zoom lens and the focus lens can be prevented and smooth magnification setting can be set with a simple structure.

BRIEF DESCRIPTION OF THE DRAWINGS

FIG. 1 is a longitudinal cross-sectional view of a lens drive device of a first embodiment of the present invention cut along a line A-A in FIG. 3;

FIG. 2 is a longitudinal cross-sectional view of the lens drive device of the first embodiment of the present invention cut along a line B-B in FIG. 3;

FIG. 3 is a cross-sectional view of the lens drive device shown in FIG. 1 taken along a line C-C;

FIG. 4 is a schematic structural view showing a relationship between a drive shaft and a piezoelectric element;

FIG. 5 is a cross-sectional view of a fitting portion between the drive shaft and a lens holder;

FIG. 6 is a waveform chart of a pulse current to be supplied to the piezoelectric element;

FIG. 7 is a longitudinal cross-sectional view of a lens drive device of a second embodiment of the present invention cut along a line A-A in FIG. 9;

FIG. 8 is a longitudinal cross-sectional view of the lens drive device of the second embodiment of the present invention cut along a line B-B in FIG. 9;

FIG. 9 is a cross-sectional view of the lens drive device shown in FIG. 7 taken along a line C-C;

FIG. 10 is a block diagram of a control section; and

FIG. 11 is a flowchart of an optical zoom operation.

DESCRIPTION OF THE SYMBOLS

1: Lens drive device
3: First lens holder
5: second lens holder
7: First drive mechanism
9: Second drive mechanism
17: Piezoelectric element
19: Vibrator
21: Drive shaft
23: Front side counter electrode
25: Rear side counter electrode
31: Fitting portion
33: Engaging portion
33a: Opening
35: Auxiliary shaft
43: Zoom lens position detector
45: Focus lens position detector
49: Position control section
71: Interference prevention section

BEST MODE FOR CARRYING OUT THE INVENTION

The following will explain embodiments of the present invention with reference to the drawings. FIG. 1 is a longitudinal cross-sectional view of a lens drive device of a first embodiment of the present invention cut along a line A-A in FIG. 3, FIG. 2 is a longitudinal cross-sectional view of the lens drive device of the first embodiment of the present invention cut along a line B-B in FIG. 3, FIG. 3 is a cross-sectional view of the lens drive device shown in FIG. 1 taken along a line C-C, FIG. 4 is a schematic structural view showing a relationship between a drive shaft and a piezoelectric element, FIG. 5 is a cross-sectional view of a fitting portion between the drive shaft and a lens holder, and FIG. 6 is a waveform chart of a pulse current to be supplied to the piezoelectric element.

A lens drive device 1 according to a first embodiment of the present invention is used in a digital camera 2 built in a cellular phone and is a lens drive device for an autofocus digital camera with an optical zoom.

As shown in FIGS. 1 and 2, the lens drive device 1 includes a first lens holder 3 and a second lens holder 5 that are driven by an electromagnetic force, a first drive mechanism 7 that drives the first lens holder 3, and a second drive mechanism 9 that drives the second lens holder 5.

In this embodiment, the first lens holder 3 holds an optical zoom lens 14, the second lens holder 5 holds a focus lens 16, the optical zoom lens 14 and the focus lens 16 are disposed on the same optical axis, and an image sensor 11 is provided at an image forming position on the optical axis.

Since the first drive mechanism 7 and the second drive mechanism 9 has substantially the same structure, only the first drive mechanism 7 is explained, the portions where the same operation and effect as those explained in the first drive mechanism 7 are assigned the same reference numerals as those explained in the first drive mechanism 7, and the detailed explanation thereof is omitted.

The first drive mechanism 7 is composed of a piezoelectric element 17 fixed to a base 15 of a housing 12 and a drive shaft 21 fixed to a vibrator 19 of the piezoelectric element 17.

As shown in FIG. 4, the piezoelectric element 17 has a front side counter electrode (one side counter electrode) 23 and a rear side counter electrode (other side counter electrode) 25, which are disposed along an axis of the drive shaft 21, and the vibrator 19 positioned between these counter electrodes. Additionally, in this embodiment, the front side is a telescopic side of the optical zoom and the rear side is a magnifying side of the optical zoom.

A power supply control section 27, which supplies a pulse current to the front side counter electrode 23 and the rear side counter electrode 25, is connected to the piezoelectric element 17, and when the pulse current is supplied to the front side counter electrode 23, the vibrator 19 is vibrated by repetition of deformation caused by its movement to the front side counter electrode and its returning to an original position by its reaction force. Likewise, when the pulse current is supplied to the front side counter electrode 23, the vibrator 19 is vibrated by repetition of deformation caused by its upward movement and its returning by its reaction force.

The drive shaft 21 has a base end 21a fixed to the vibrator 19 of the piezoelectric element 17 and a tip end 21b is a free end. A cross section of the drive shaft 21 is circular (see FIG. 5).

The first lens holder 3 has fitting portions 31 with the drive shafts 21 at its one end portion, and each fitting portion 31 has a polygonal cross section, e.g., a square hole in this embodiment, as shown in FIG. 5, and comes into point contact with the drive shaft 21 having a circular cross section at its cross section. Thus, point contact makes it possible to release powder, dust and like caused by friction between the drive shafts 21 and the fitting portions 31 of the first lens holder 3 to a non-contact portion, and therefore it is possible to increase driving reliability.

The first lens holder 3 has engaging portions 33 with auxiliary shafts at its other end portion, and each engaging portion 33 is engaged with an auxiliary shaft 35, which is disposed at the base of a housing 13 in a standing condition to be substantially parallel to the drive shaft, to guide movement of the first lens holder 3. The engaging portion 33 has a substantially U-shape cross section and a U-shape opening 33a is formed at a side far away from the drive shaft 21.

An explanation will be next given of the operation and effect of the first embodiment according to the present invention.

In this embodiment, the first lens holder 3 is moved to change a magnification with the optical zoom, and at the same time the second lens holder is moved to adjust a focal length.

When the first lens holder 3 is moved to a telescopic side (front side), a predetermined pulse current is supplied to the front side counter electrode 23 to vibrate the vibrator 19. When the pulse current is supplied thereto, the vibrator 19 is deformed so as to project to the front side, the drive shaft 21 is moved to the front side, and the first lens holder 3 is moved to the front side due to the friction with the drive shaft 21 at the fitting portion 31. Next, when the vibrator 19 is returned to the original position quickly by its reaction force, only the drive shaft 21 is returned to an initial position together with the vibrator 19 by an inertia force. By repeating such operations, the first holder is moved forward along the drive shaft.

The power supply control section 27 supplies the current with a waveform shown in FIG. 6 to the piezoelectric element 17, but in this embodiment, voltage V is several tens of V and frequency H is several tens of KHz with which smooth movement can be achieved. Incidentally, the pulse current can change a moving velocity of the first lens holder 3 by changing the frequency H.

In the first lens holder 3, slight vibration (shaking) occurs in a direction crossing the drive shaft 21 during forward movement, but the cross section of each engaging portion 33 engaging with the auxiliary shaft 35 is substantially U-shaped and the U-shape opening 33a is formed at the side far away from the drive shaft 21, and therefore it is possible to guide the first lens holder 3 while vibration of the lens holder occurred in the direction crossing the drive shaft 21 is released.

Similarly, when the first lens holder 3 is moved to the magnifying side (rear side), the same pulse current is supplied to the rear side counter electrode 25 of the piezoelectric element 17 to vibrate the vibrator 19, whereby the first lens holder 3 is moved backward.

Additionally, regarding the driving of the second lens holder 5, a predetermined pulse current is supplied to the piezoelectric element 17 as in the first holder 3, whereby the second lens holder can be moved forward or backward.

According to this embodiment, since the drive mechanism of each of the first and second lens holders 3 and 5 includes only the piezoelectric element 17 and the drive shaft 21, it is unnecessary to provide a magnet, a yoke, a coil, and the like unlike the linear motor mechanism, thus allowing the mechanism to be simplified and extremely miniaturized.

Particularly, since the piezoelectric element 17 is fixed to the base 15 of the housing and the drive shaft 21 is provided in the optical axis direction, there is no drive mechanism on the surrounding parts of the first and second lens holders 3 and 5, and therefore it is possible to reduce a width of the lens in an aperture direction.

Moreover, since the first and second lens holders 3 and 5 are supported by the auxiliary shafts 35, the lens holders 3 and 5 can be stably moved.

A second embodiment of the present invention will be next explained with reference to FIGS. 7 to 11. FIG. 7 is a longitudinal cross-sectional view of a lens drive device of the second embodiment of the present invention cut along a line A-A in FIG. 9, FIG. 9 is a cross-sectional view of the lens drive device shown in FIG. 7 taken along a line C-C, FIG. 10 is a block diagram of a position control section, and FIG. 11 is a flowchart of an optical zoom operation. Additionally, in the second embodiment set forth below, the portions where the same operation and effect as those explained in the first embodiment are assigned the same reference numerals as those explained in the first embodiment, the detailed explanation thereof is omitted, and points different from the first embodiment are mainly explained.

As shown in FIGS. 7 and 8, the lens drive device 1 according to the second embodiment, the tip end 21b of the drive shaft 21 is held in such a manner to be inserted into a holding tool 41 fixed to the housing 13. Moreover, as shown in FIG. 9, each resin-made fitting portion 51 where each lens holder 31 is engaged with the drive shaft 21 has an opening 53 at one end side surrounding the drive shaft 21, and a space of the opening 53 is adjusted by a screw 55 to achieve free adjustment of friction between the fitting portion 51 and the drive shaft 21. Additionally, a predetermined friction may be imparted by using elasticity of the fitting portion 51 without providing the screw 55.

Further, as shown in FIGS. 7 and 8, the lens drive device 1 includes a zoom lens position detector 43 that detects a position of the optical zoom lens holder 3, a focus lens position detector 45 that detects a position of the optical focus lens holder 5, a zoom operation section 47, and a position control section 49.

The zoom lens position detector 43 and the focus lens position detector 45 have the same structure, and each is composed of a pole member 57 having different magnetic poles alternately disposed along the optical axis direction of the lens and an MR sensor 59 that detects a magnetic pole. The MR sensor 59 is fixed to each of holders 3 and 5 and moves with each of the holders 3 and 5 to allow a moving amount and a moving direction to be detected from a reference position (or initial position) of each holder. A position information signal of each MR sensor 59 is sent to the position control section 49 by a flexible wiring board 60.

As shown in FIG. 10, the position control section 49 includes a focus lens position calculation section 61, a zoom position calculation section 63, a zoom lens drive section 65, a focus lens drive section 67, a zoom position setting section 69, an interference prevention section 71, and a focus comparison section 73.

The focus lens position calculation section 61 calculates a position of the focus lens 16 from a detection signal received from the MR sensor 59 of the focus lens position detector 45 and transmits a calculated position signal to the interference prevention section 71. The zoom lens position calculation section 63 calculates a position of the zoom lens 14 from a detection signal received from the MR sensor 59 of the zoom lens position detector 43 and transmits a calculated position signal to the interference prevention section 71.

The zoom position setting section 69 stores the positions of the zoom lens 14 in accordance with the respective magnifications of zooms 1.2×, 1.4×, 1.6×, ... 2.4×, 2.6×, 2.8×, 3.0×, etc, and when receiving a set zoom magnification by the operation of the zoom operation section 47, the zoom position setting section 69 sends to the interference prevention section 71 a target position signal of the zoom lens 14 according to the magnification.

The interference prevention section 71 makes a comparison between the target position of the zoom lens according to the zoom magnification and a current position of the zoom lens 14 from the zoom position setting section 69, and determines whether or not there is the focus lens 16 between these positions (moving range of the zoom lens). Then, when there is the focus lens 16 in the moving range of the zoom lens 14, a drive signal is issued to the focus lens drive section 67 so as to drive the focus lens 16 outside the moving range of the zoom lens. When there is no focus lens 16 in the moving range of the zoom lens, a drive signal is issued to the zoom lens drive section 65 so as to drive the zoom lens 14 to the position according to the zoom magnification directly.

An explanation will be next given of photographing magnification setting by the lens drive device 1 with reference to FIG. 11. When a photographing magnification is set to a predetermined photographing magnification by the zoom operation section 47, the zoom position setting section 69 calculates a moving target position of the zoom lens according to the set magnification upon reception of the set signal, and transmits the position signal to the interference prevention section 71 (step S1).

Next, the zoom lens position calculation section 63 calculates a current position of the zoom lens based on the signal received from the MR sensor of the zoom lens position detector 43 and transmits a position detection signal to the interference prevention section 71 (step S2).

Likewise, the focus lens position calculation section 61 calculates a current position of the focus lens based on the signal received from the MR sensor of the focus lens position detector 45 and transmits a position detection signal to the interference prevention section 71 (step S3).

The interference prevention section 71 determines whether or not there is the focus lens 16 between the current position of the zoom lens 14 and the moving target position thereof. When there is the focus lens 16 (focus lens interferes), the interference prevention section 71 issues to the focus lens drive section 67 a signal that moves the focus lens 16 to a position out of an area (interference range) between the current position of the zoom lens 14 and the moving target position thereof, for example, a position, which is in a direction away from the zoom lens 14 and 1 mm outside the moving target position of the zoom lens or an initial position of the focus lens (position closest to the image sensor 11), and then moves the focus lens 16 to an interference prevention position (step S5).

On the other hand, when there is no focus lens 16 between the current position of the zoom lens 14 and the moving target position thereof, the interference prevention section 71 moves the zoom lens 14 to the target moving position (step S6).

After that, the interference prevention section 71 moves the focus lens 16 to a focal position with respect to the zoom lens 14 placed at the target position. A focal point of the focus lens is detected when a peak of a high frequency component in the image sensor 11 is compared for each position of the focus lens by the focus comparison section 73. The focus comparison section 73 issues a drive signal to the focus lens until the peak of the high frequency component is detected, and when the peak of the high frequency component is detected, movement of the focus lens is stopped (movement to the focal position) (step S7).

According to the second embodiment, when the photographing magnification is set, interference between the zoom lens 14 and the focus lens 16 can be prevented and smooth magnification setting can be achieved with a simple structure.

The present invention is not limited to the aforementioned embodiments, and can variously be modified without departing from the scope of the present invention.

For example, it is enough that the fitting section 31 of the first lens holder 3 or 5 and the drive shaft 21 may come into point contact with each other at their cross sections, and the fitting portion is not limited to a square shape, and triangular and hexagonal shapes may be possible, and the drive shaft 21 may have an elliptical cross section.

The lens drive device 1 may have only the second lens holder for focusing, one drive shaft 21 and piezoelectric element 17.

In the second embodiment, the position control section 49 calculates the position of the zoom lens 14 and that of the focus lens 16 to prevent interference, but may calculate the position of the zoom lens holder 3 and that of the focus lens holder 5 to prevent interference.

INDUSTRIAL APPLICABILITY

The present invention is used in a small-size camera and a camera device mounted on a cellular phone.

The invention claimed is:

1. A lens drive device comprising:

a first drive shaft, having a circular or elliptical shaped cross section, and being disposed along an optical axis direction of a first lens;

an optical zoom lens holder including a fitting portion, having a polygonal shaped cross section, inserted onto the first drive shaft such that the fitting portion of the optical zoom lens holder and the first drive shaft come into point contact with each other at their cross sections;

a first piezoelectric element, provided at a base end of the first drive shaft, and comprising a first counter electrode, a second counter electrode, and a first vibrator fixed to the base end of the first drive shaft and disposed between the first and second counter electrodes, wherein when a pulse current is applied to one of the first and second counter electrodes, the first vibrator is moved, returned to an original position by a reaction force, and the first drive shaft is vibrated in an axial direction by vibration of the first vibrator produced by applying the pulse current to the first piezoelectric element such that the optical zoom lens holder is moved in the optical axis direction of the first lens;

a second drive shaft, having a circular or elliptical shaped cross section, and being disposed along an optical axis direction of a second lens;

an optical focus lens holder including a fitting portion, having a polygonal shaped cross section, inserted onto the second drive shaft such that the fitting portion of the optical focus lens holder and the second drive shaft come into point contact with each other at their cross sections;

a second piezoelectric element, provided at a base end of the second drive shaft, and comprising a third counter electrode, a fourth counter electrode, and a second vibrator fixed to the base end of the second drive shaft and disposed between the third and fourth counter electrodes, wherein when a pulse current is applied to one of the third and fourth counter electrodes, the second vibrator is moved, returned to an original position by a reaction force, and the second drive shaft is vibrated in an axial direction by vibration of the second vibrator produced by applying the pulse current to the second piezoelectric element such that the optical focus lens holder is moved in the optical axis direction of the second lens;

a zoom lens position detector that detects a position of the optical zoom lens holder;

a focus lens position detector that detects a position of the optical focus lens holder;

a zoom setting section; and a position control section, wherein when determining that the focus lens holder exists in a moving range from a current position of the zoom lens holder to a position of a magnification set by the zoom setting section, the position control section moves the focus lens holder outside a moving range of the zoom lens holder and thereafter moves the zoom lens holder to the set position.

* * * * *